Aug. 9, 1927.

J. McGINNIESS

VEHICLE WHEEL

Filed Oct. 12, 1926

INVENTOR.
John McGinniess
BY Watson E Coleman
ATTORNEY.

Aug. 9, 1927.

J. McGINNIESS

VEHICLE WHEEL

Filed Oct. 12, 1926

INVENTOR.
John McGinniess
BY
Watson E. Coleman
ATTORNEY.

Patented Aug. 9, 1927.

1,638,741

UNITED STATES PATENT OFFICE.

JOHN McGINNIESS, OF TRINIDAD, COLORADO, ASSIGNOR TO McGINNIESS VEHICLE WHEEL COMPANY, A CORPORATION OF COLORADO.

VEHICLE WHEEL.

Application filed October 12, 1926. Serial No. 141,222.

This invention relates to vehicle wheels and it is primarily an object of the invention to provide a wheel of a disc type relatively light in weight and which is quickly demountable from the spindle and the axle parts.

It is also an object of the invention to provide a wheel of this kind constructed in a manner whereby it can be removed in its entirety without in any way disturbing the brake mechanism or spindle of the automobile or other vehicle.

Another object of the invention is to provide a wheel of this kind which is constructed in a manner to make the same substantially dirtproof whereby the life for both the wheel and the bearing parts is materially prolonged.

An additional object of the invention is to provide a wheel of this kind wherein the tire associated therewith may be easily and quickly mounted or removed without disturbing the fixed parts of the automobile or kindred vehicle, such as the spindle and axle, and also without the necessity of removing or loosening and tightening rim retaining bolts.

The invention consists in the details of construction and in the combination and arrangement of the several parts of my improved vehicle wheel whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:—

Figure 1:
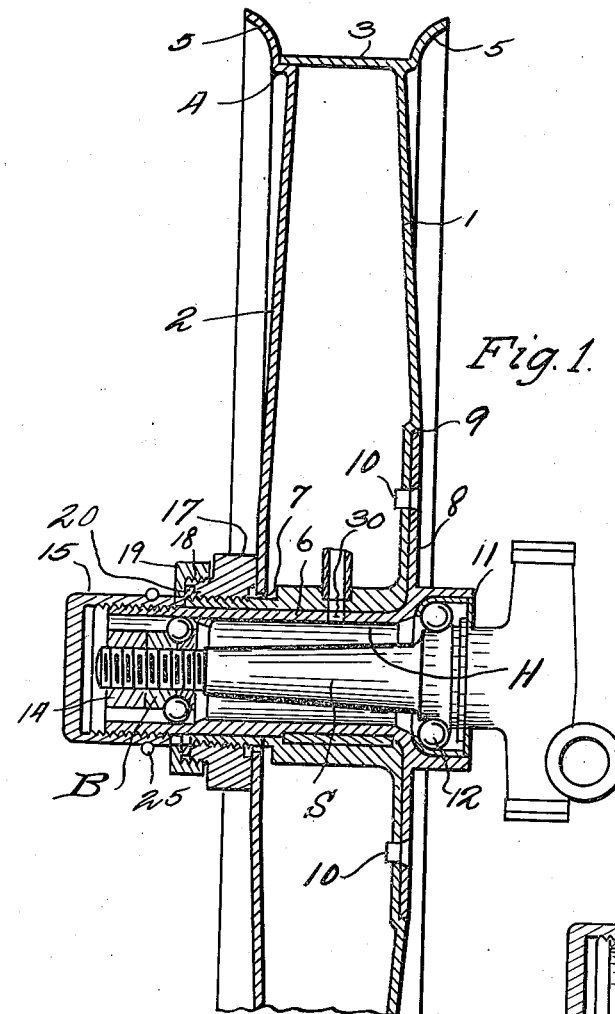
Figure 1 is a fragmentary sectional view, with the coacting spindle in elevation, illustrating a vehicle wheel constructed in accordance with an embodiment of my invention.

As disclosed in the accompanying drawings, 1 denotes the inner disc and 2 the outer disc, both being dished and having their concaved faces opposed. Integrally formed with the peripheral portion of the disc 1 is an inwardly directed rim flange 3, the free marginal portion of which snugly engages an annular shoulder 4 provided at the peripheral portion of the disc 2. The disc 1 outwardly of the flange 3 and the disc 2 outwardly of the shoulder 4 are provided with the retaining flanges 5 for an applied tire T.

The inner disc 1 has formed with the central portion thereof a hub tube or sleeve 6 of a length to extend a desired distance beyond the outer disc 2, the central portion of said disc 2 being provided with an opening 7 to provide for such assembly. This tube or sleeve 6 is snugly mounted upon a hub H provided at its inner portion with a hub flange 8 which is snugly received within a pocket or depression 9 suitably formed in the central portion of the disc 1. The flange 8 is secured to the disc 1 in any desired manner, as indicated at 10. The fastening means 10, such as pins or dowels, hold the inner disc 1 and the hub H in correct alignment and also effect the desired driving connection with the hub H.

Figure 5:
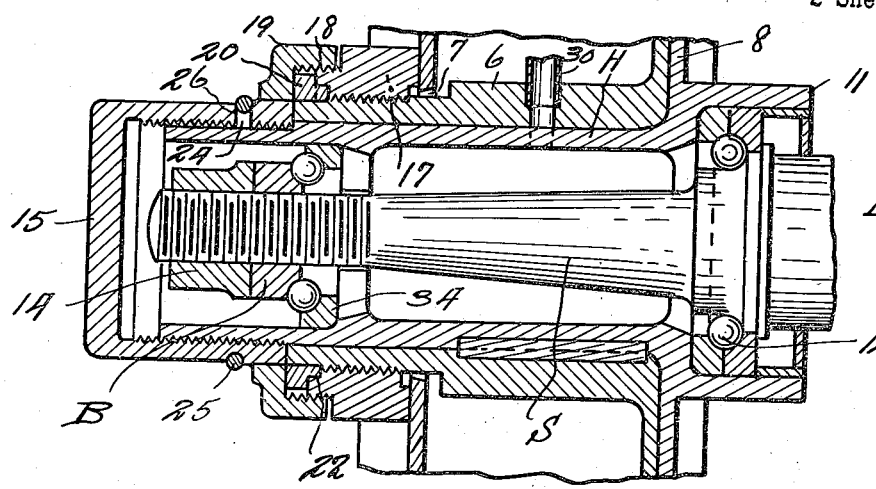
Figure 5 is an enlarged sectional view taken lengthwise through the central or hub portion of my improved wheel, the associated spindle being in elevation.
Figure 6:
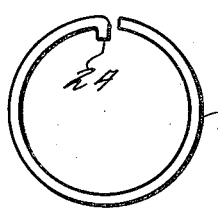
Figure 6 is an elevational view of the resilient split locking ring for the hub cap as herein disclosed.
Figure 7:
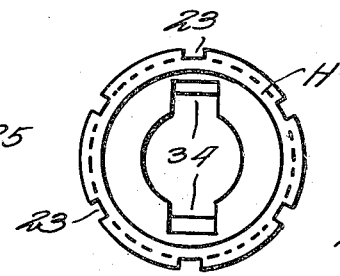
Figure 7 is a view in end elevation of the hub proper as herein embodied.
Figures 8, 9:
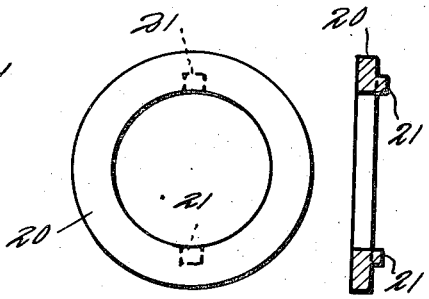
Figure 8 is a view in elevation of the lock washer herein shown.
Figure 9 is a sectional view taken radially through Figure 8.
Figure 10:
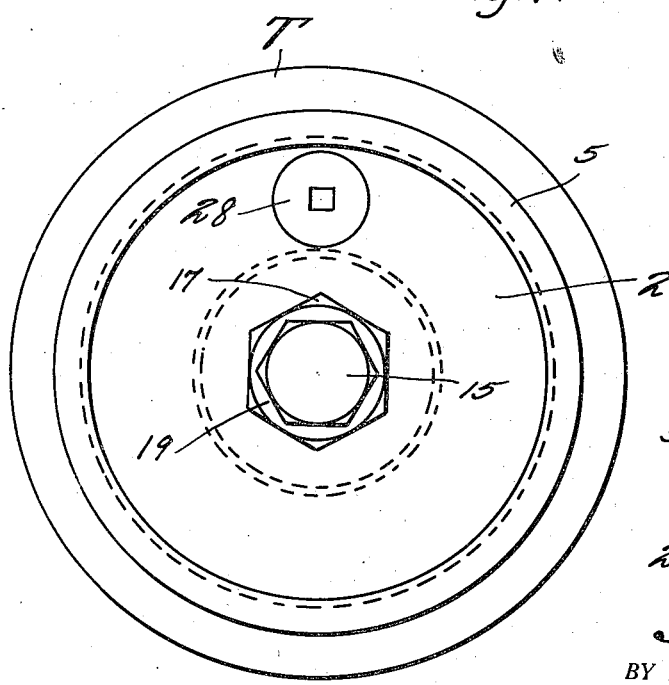
Figure 10 is a view in outer elevation of the wheel structure as herein disclosed.

The inner end portion of the hub H beyond the inner disc 1, as illustrated in Figures 1 and 5, is formed with a conventional outer bearing race 11 with which coacts in a well known manner the anti-friction members 12, herein disclosed as conventional ball bearings.

The outer portion of the spindle S together with the adjacent end portion of the hub H have associated therewith an antifriction bearing B of a conventional type maintained in applied position by the holding nut 14, said bearing and nut being readily removable when desired.

The outer portion of the hub H extends beyond the outer end of the tube or sleeve 6 in the assembled wheel and engaged with said extended portion is a hub cap 15.

Threaded upon the outer portion of the hub tube or sleeve 6 is a main holding nut 17 for the central portion of the disc 2. This main holding nut 17 has its outer portion reduced in thickness from its peripheral surface, as at 18, and threading upon such reduced portion 18 is a nut 19 for holding in operative engagement with the nut 17 the lock washer 20. This lock washer 20, as herein disclosed, is provided at diametrically opposed points with the laterally directed lugs 21 which are engaged within suitable recesses or notches 22 provided in the outer edge face of the nut 17. The nut 19 surrounds the inner portion of the applied hub cap 15.

The outer extended portion of the hub H is provided therealong with a series of longitudinally disposed and circumferentially spaced grooves or slots 23 in which is adapted to be selectively engaged an inwardly directed lug or finger 24 carried by an end portion of a split resilient ring 25. This ring 25 surrounds the inner portion of the hub cap 15 with the lug or finger 24 directed through an opening 26 therein whereby said lug or finger may be received with a groove or slot 23 to hold the cap 15 from turning or backing off of the hub H.

Figure 3:
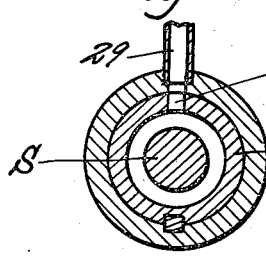
Figure 3 is a sectional view taken through the hub structure as illustrated in Figure 1.
Figure 4:
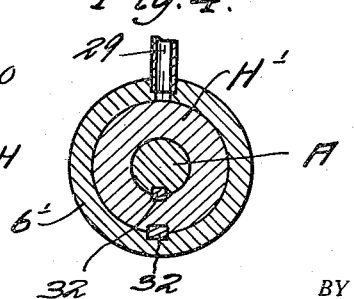
Figure 4 is a sectional view taken through the hub structure illustrated in Figure 2.

The outer disc 2 is provided with a suitably located opening 27 normally closed by a plug 28. Terminating closely adjacent to this opening 27 is the outer end extremity of a pipe 29 carried by the hub tube or sleeve 6. As illustrated in Figures 1 and 3, the bore of this pipe 29 is continued by an opening 30 through the hub H. Upon removing the plug 28 suitable lubricant may be applied through the pipe 29 to the hub H whereby the bearings B and 12 may be effectively lubricated.

Figure 2:
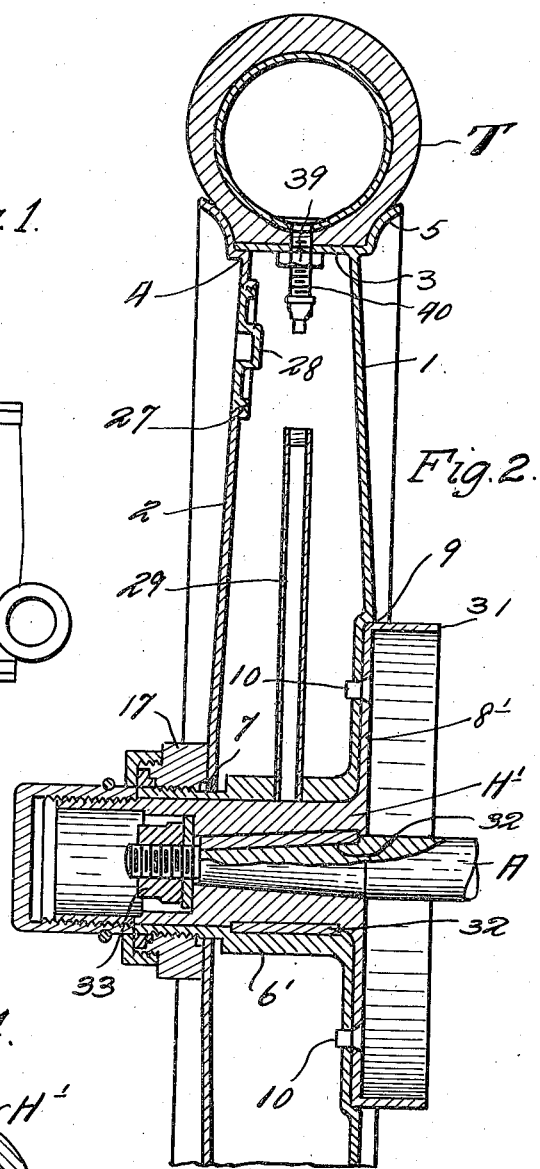
Figure 2 is a fragmentary sectional view illustrating my improved wheel structure mounted upon a rear or driving axle and with a tire applied.

In the embodiment of my invention as particularly illustrated in Figure 2, my improved wheel structure is mounted upon the rear axle of an automobile or other vehicle. The structure of the wheel is substantially the same as shown in Figure 1 except that the hub flange 8' has its peripheral portion provided with the outwardly directed flange 31 whereby a conventional brake drum is provided and the hub H' is keyed, as at 32, or otherwise fixed to the axle A for rotation therewith. The outer portion of the axle A has engaged therewith a nut 33 for holding the hub H' upon the axle A.

The hub H is provided with the internal slots 34 to provide means to permit a drift tool to enter and drive out the bearing B or more particularly the race 35 associated therewith.

Figure 11:
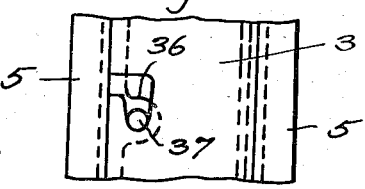
Figure 11 is a fragmentary view in top plan illustrating a means for locking the rim flange to the outer disc.
Figure 12:
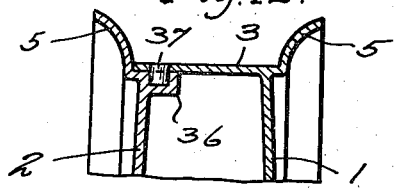
Figure 12 is a fragmentary sectional view taken transversely through the structure illustrated in Figure 11.

In Figures 11 and 12, I illustrate a means whereby the rim flange 3 is positively locked to the outer disc 2. The outer disc 2 immediately adjacent to its peripheral shoulder 4 is provided with one or more inwardly directed lugs 36 each provided with a pin 37 engaging within a bayonet slot 38 suitably provided in the free marginal portion of the rim flange 3. By relative lateral and axial movement of the discs 1 and 2, the pin 37 may be readily engaged within the slot 38 to effect the desired locking action or to permit the desired release.

The wheel proper is readily engageable on either a front or rear hub and to remove the wheel proper it is only necessary to take off the hub cap 15. The wheel body can then be readily slid off of the hub H. As before stated, the fastening means comprise pins or dowels readily permitting such action.

To remove the tire T it is only required to remove the nut 17 and the associated washer 20 and nut 19. This permits the outer disc 2 to be removed with a consequent ready and convenient removal of the tire T and its resultant replacement. In taking off or applying the tire T it is not necessary to take off the hub cap 15 nor is it necessary to disturb any of the hub parts or brakes from their normal positions.

In removing the tire T, it is to be understood, of course, that the nut 39 must be first removed from the valve stem 40 as is required in connection with the wheel structures now generally in use.

By being able to readily remove the wheel body proper it is possible to replace the same with another wheel body with a spare tire already mounted thereon and thus avoiding the necessity of mounting the spare tire alone. This, of course, is a matter of preference.

Actual practice has clearly established the fact that the pressure exerted by the nut 17 is sufficient to hold the outer disc 2 tight against the rim flange 3 but to further assure this action I find it of advantage to provide the additional means as illustrated in Figures 11 and 12.

From the foregoing description it is thought to be obvious that a vehicle wheel constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

1. A vehicle wheel comprising a pair of discs, a hub sleeve carried by one of said discs and extending through and beyond the second disc, a rim flange carried by one of the discs and bridging the space between the two discs, and means carried by the hub sleeve and engaging a disc for maintaining the discs in assembled relation.

2. A vehicle wheel comprising a pair of discs, a hub sleeve carried by one of said discs and extending through and beyond the second disc, a rim flange carried by one of the discs and bridging the space between the two discs, means carried by the hub sleeve and engaging a disc for maintaining the discs in assembled relation, and means for connecting the rim flange to the second disc.

3. A vehicle wheel comprising a pair of discs, a hub sleeve carried by one of said discs and extending through and beyond the second disc, a rim flange carried by one of the discs and bridging the space between the two discs, means carried by the hub sleeve and engaging a disc for maintaining the discs in assembled relation, and a hub fixed to one of the discs and extending through the hub sleeve.

4. A vehicle wheel comprising a pair of discs, a hub sleeve carried by one of said discs and extending through and beyond the second disc, a rim flange carried by one of the discs and bridging the space between the two discs, means carried by the hub sleeve and engaging a disc for maintaining the discs in assembled relation, and a hub fixed to one of the discs and extending through the hub sleeve, said connection between the hub and one of the discs readily separating upon movement of the wheel structure in one direction upon the hub.

5. A vehicle wheel comprising a pair of discs, a hub sleeve carried by one of said discs and extending through and beyond the second disc, a rim flange carried by one of the discs and bridging the space between the two discs, means carried by the hub sleeve and engaging a disc for maintaining the discs in assembled relation, a hub fixed to one of the discs and extending through the hub sleeve, and a hub cap engageable with the hub, the adjacent disc being readily movable over said applied cap upon release of the means for holding the discs in assembled relation.

6. A vehicle wheel comprising a pair of discs, a hub sleeve carried by one of said discs and extending through and beyond the second disc, a rim flange carried by one of the discs and bridging the space between the two discs, means carried by the hub sleeve and engaging a disc for maintaining the discs in assembled relation, a hub fixed to one of the discs and extending through the hub sleeve, a hub cap engageable with the hub, the adjacent disc being readily movable over said applied cap upon release of the means for holding the discs in assembled relation, and releasable means for holding the hub cap against turning off.

7. A vehicle wheel comprising a pair of discs, a hub sleeve carried by one of said discs and extending through and beyond the second disc, a rim flange carried by one of the discs and bridging the space between the two discs, means carried by the hub sleeve and engaging a disc for maintaining the discs in assembled relation, a pipe positioned between the assembled discs and carried by the hub sleeve, the bore of the pipe being continued through the wall of the hub sleeve, one of the discs having a normally closed opening in close proximity to the outer end of said pipe.

8. A vehicle wheel comprising a pair of discs, a hub sleeve carried by one of said discs and extending through and beyond the second disc, a rim flange carried by one of the discs and bridging the space between the two discs, means carried by the hub sleeve and engaging a disc for maintaining the discs in assembled relation, and a lubricating means carried by the hub sleeve intermediate the assembled discs.

In testimony whereof I hereunto affix my signature.

JOHN McGINNIESS.